US006868206B2

(12) United States Patent
Martin et al.

(10) Patent No.: US 6,868,206 B2
(45) Date of Patent: Mar. 15, 2005

(54) MULTIPLE CHANNEL OPTICAL ASSEMBLY AND METHOD OF MANUFACTURE

(75) Inventors: Graham Martin, Woodland Hills, CA (US); Fritz Strohkendl, Oxnard, CA (US); Leo Lam, Calabasas, CA (US); Tallis Y. Chang, Northridge, CA (US)

(73) Assignee: Chromux Technologies, Inc., Oxnard, CA (US)

( * ) Notice: Subject to any disclaimer, the term of this patent is extended or adjusted under 35 U.S.C. 154(b) by 19 days.

(21) Appl. No.: 10/392,323

(22) Filed: Mar. 19, 2003

(65) Prior Publication Data

US 2004/0184729 A1 Sep. 23, 2004

(51) Int. Cl.[7] .................................................. G02B 6/32
(52) U.S. Cl. .......................................... 385/33; 385/119
(58) Field of Search ............................. 385/33, 54, 55, 385/73, 74, 88–93, 115, 119, 52

(56) References Cited

U.S. PATENT DOCUMENTS

2002/0031308 A1 * 3/2002 Uekawa et al. ............... 385/52
2002/0150358 A1 * 10/2002 Deck et al. .................... 385/93
2003/0103713 A1 * 6/2003 Pan et al. ...................... 385/16

* cited by examiner

Primary Examiner—Juliana K. Kang
(74) Attorney, Agent, or Firm—Hogan & Hartson L.L.P.

(57) ABSTRACT

A collimator array is disclosed that carries forward its alignment characteristics to optical devices that incorporate it. Little, if any active alignment need be performed in the manufacturing of such optical devices, such as switching arrays and optical add/drop arrays that employ a plurality of such collimator arrays in each device. The collimator array includes a fiber array having a plurality of regularly spaced optical fibers such that an output axis of each optical fiber has a predetermined spatial position and orientation with respect to a reference edge of the fiber array. The collimator array also includes an array of lenses separated from the fiber array by an air gap and aligned with the fiber array at an alignment position. The aligned position is such that collimated light exiting each lens has a predetermined position and direction with respect to the reference edge of the fiber array.

17 Claims, 14 Drawing Sheets

Exploded View of Collimator Array Assembly

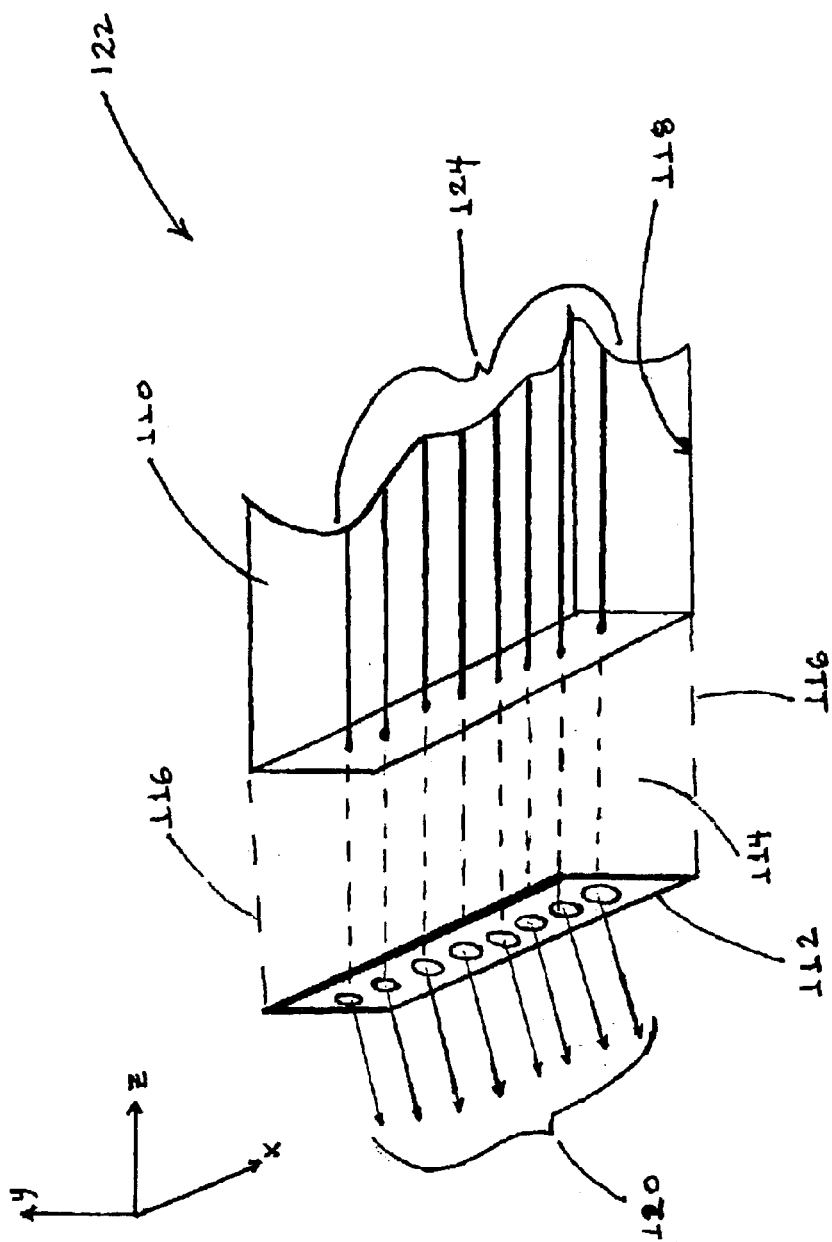
FIG. 1A: FUNCTIONAL REPRESENTATION OF COLLIMATOR ARRAY WITH FREE-SPACE OPTICAL INTERCONNECTION

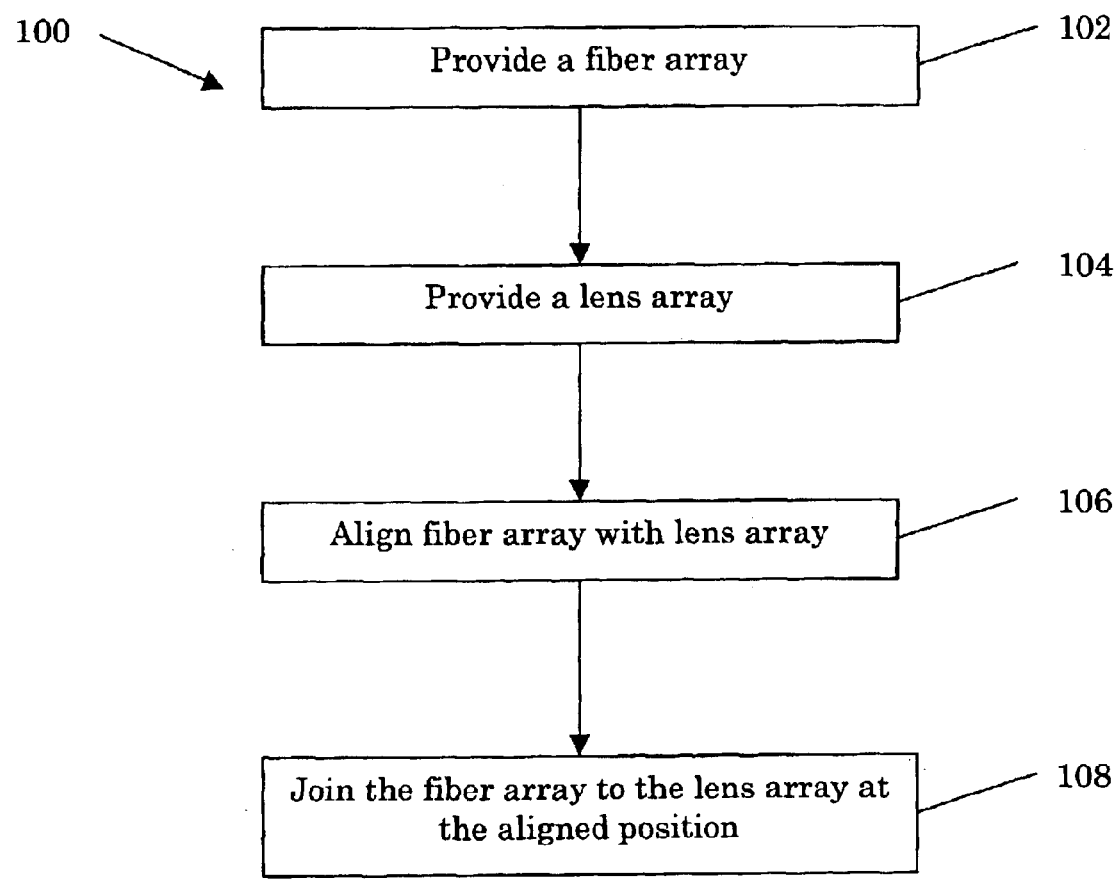
FIG. 1B : Assembling a Collimator Array
With Free Space Optical
Interconnection

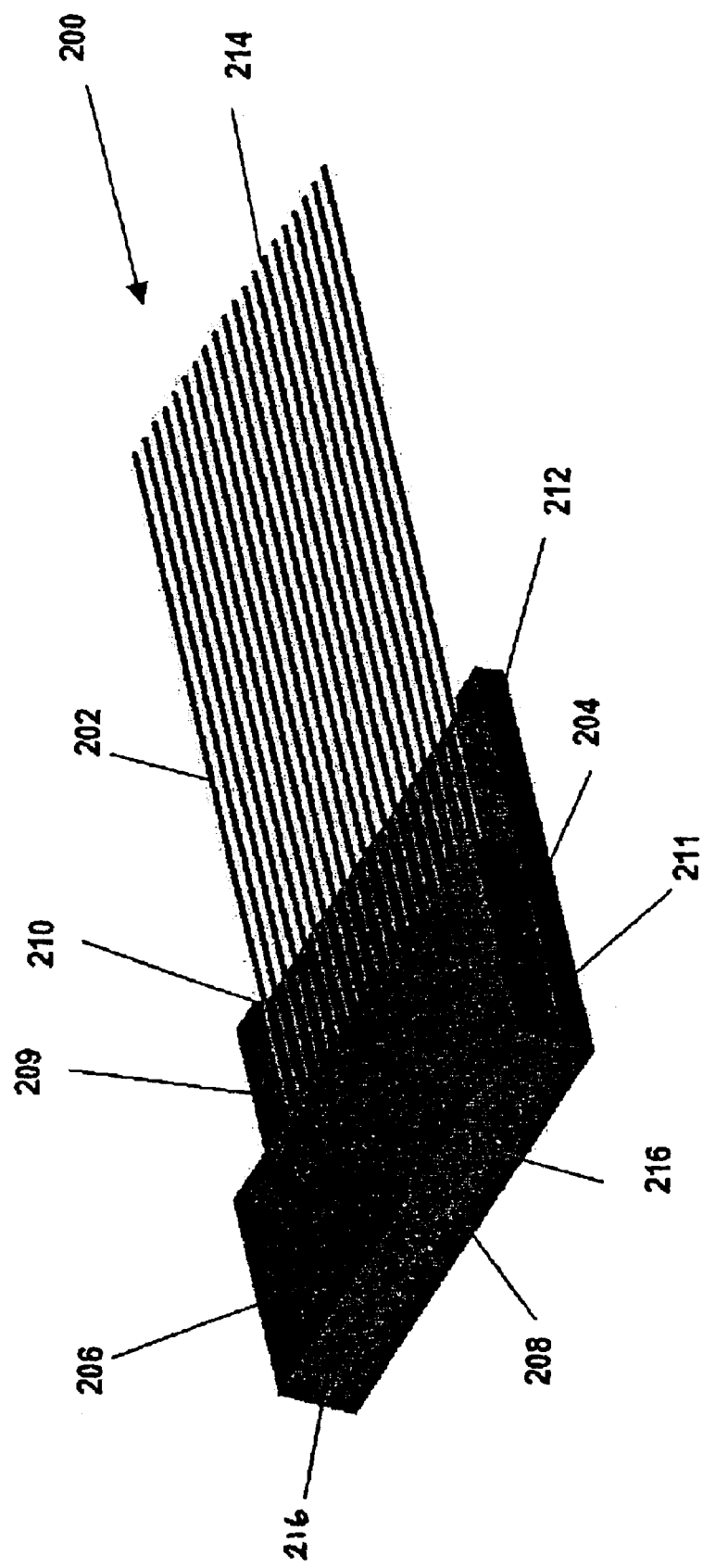
FIG. 2: A Fiber Array

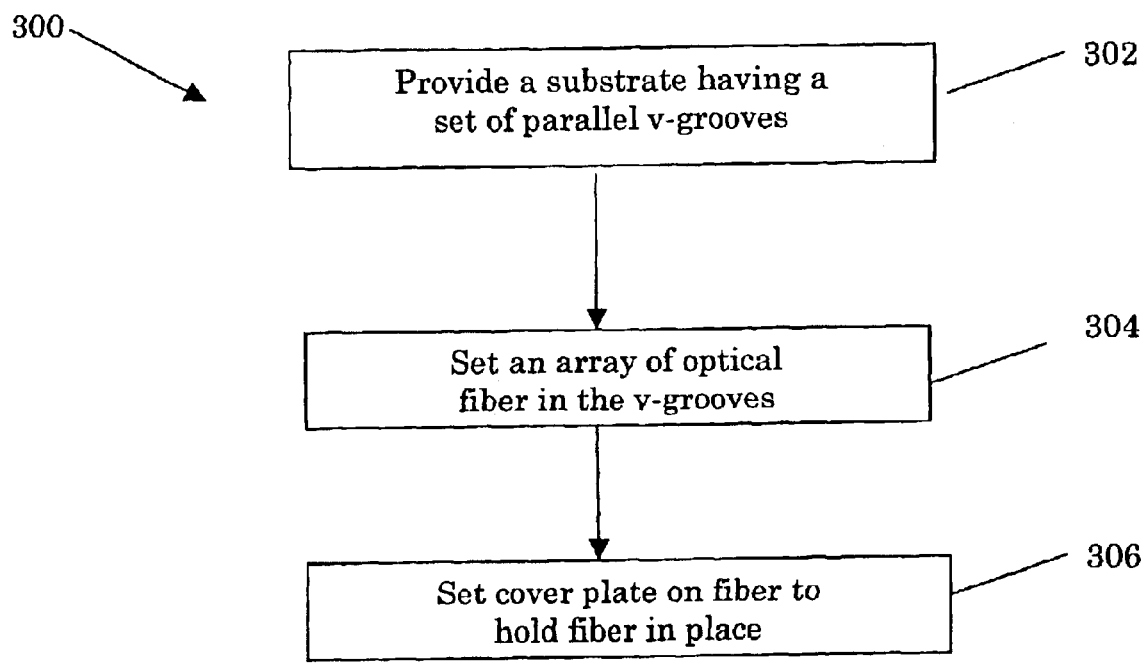
FIG. 3 : Providing a Fiber Array

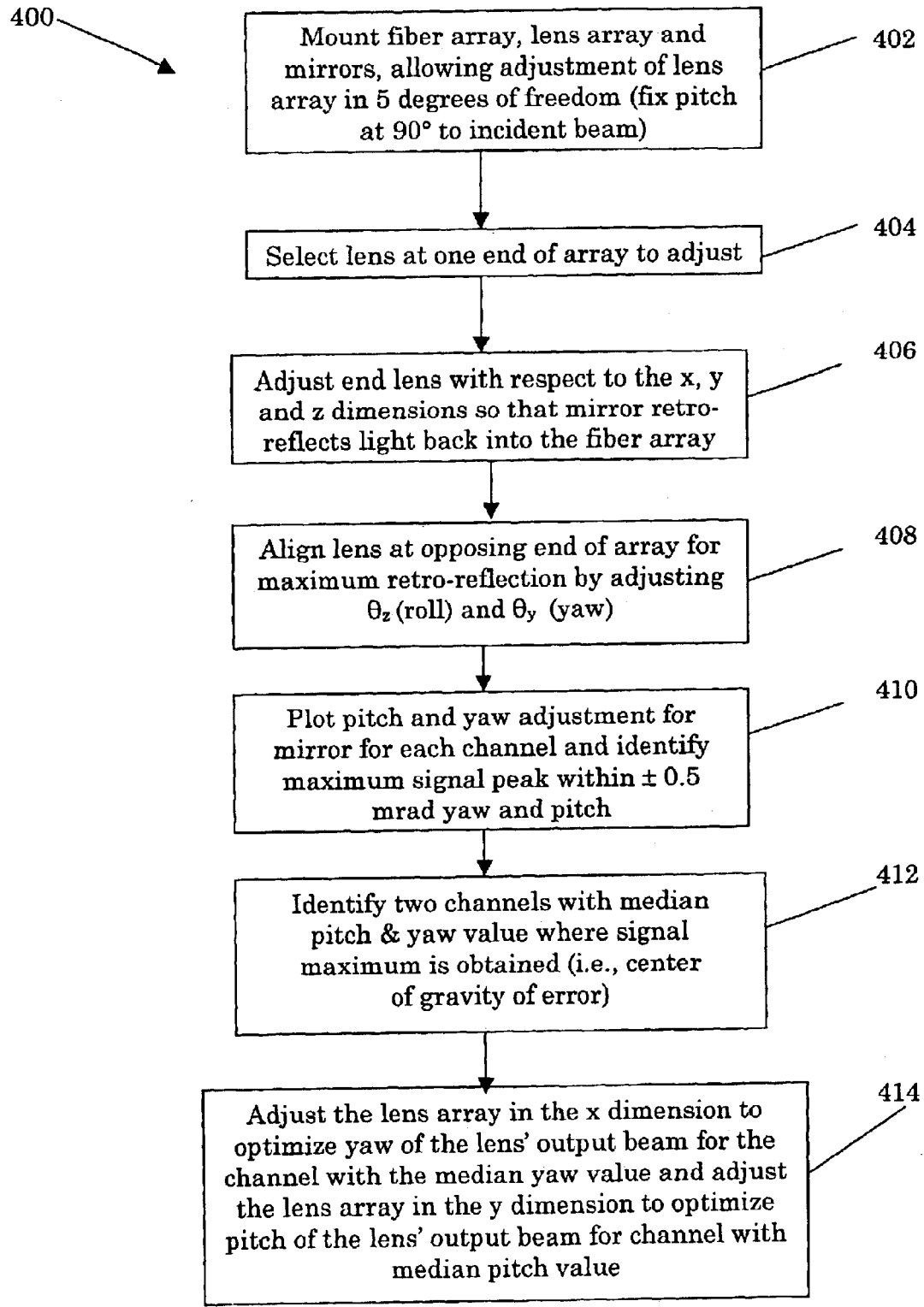
FIG. 4A : Aligning a Lens Array with a Fiber Array

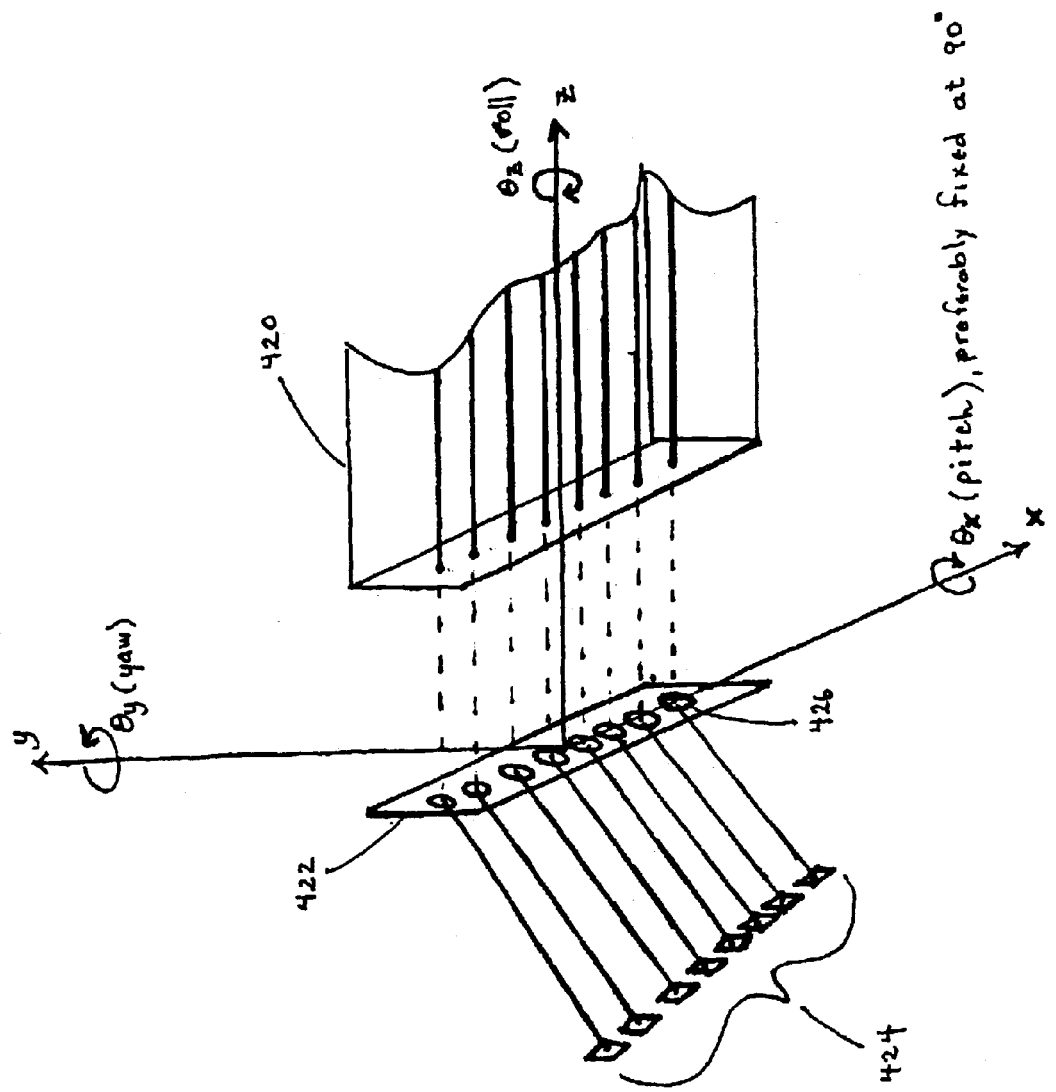
FIG. 4B: Mounting the lens array for Alignment with the Fiber Array

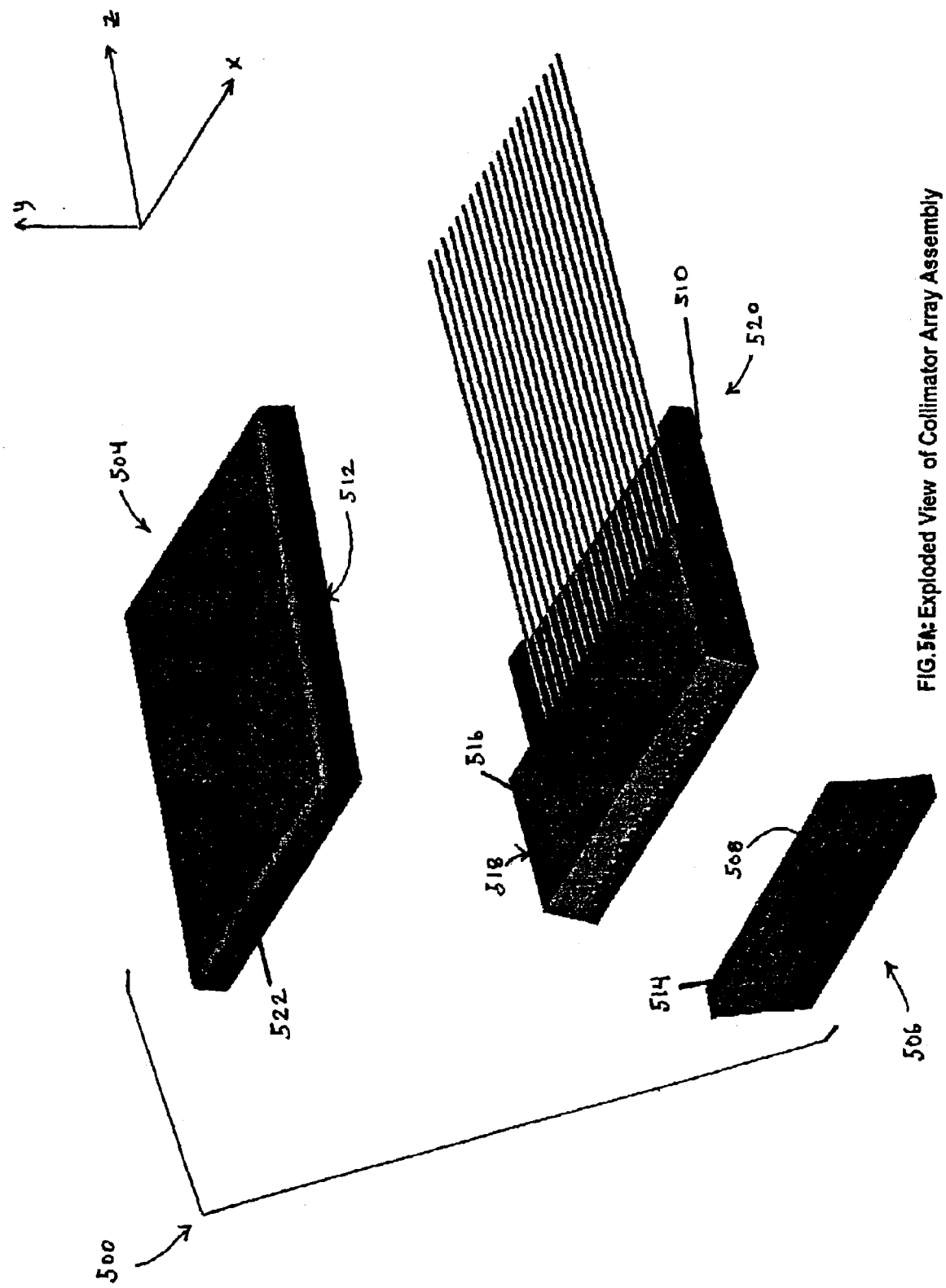
FIG. 5A: Exploded View of Collimator Array Assembly

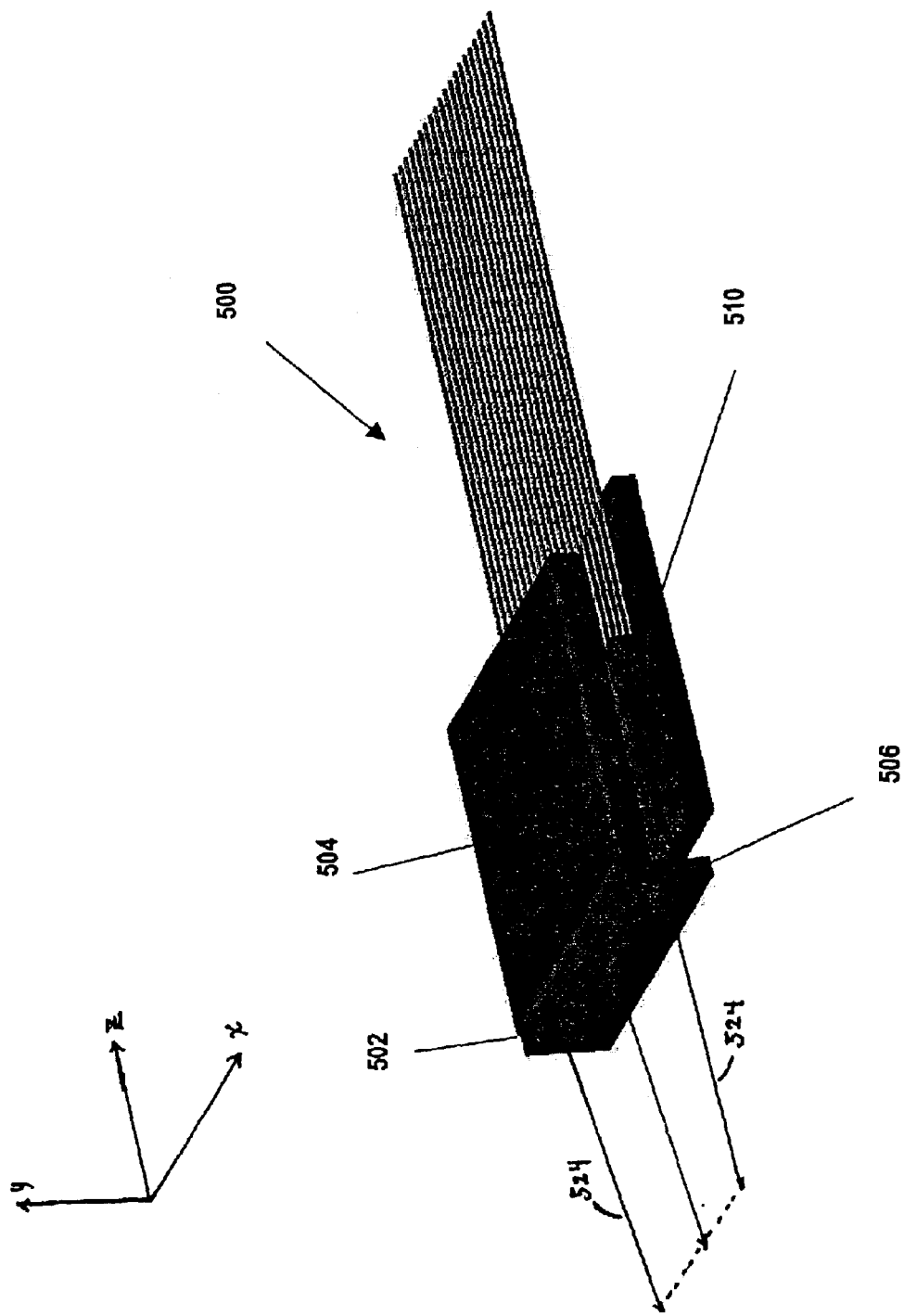
FIG. 5B: A Collimator Array

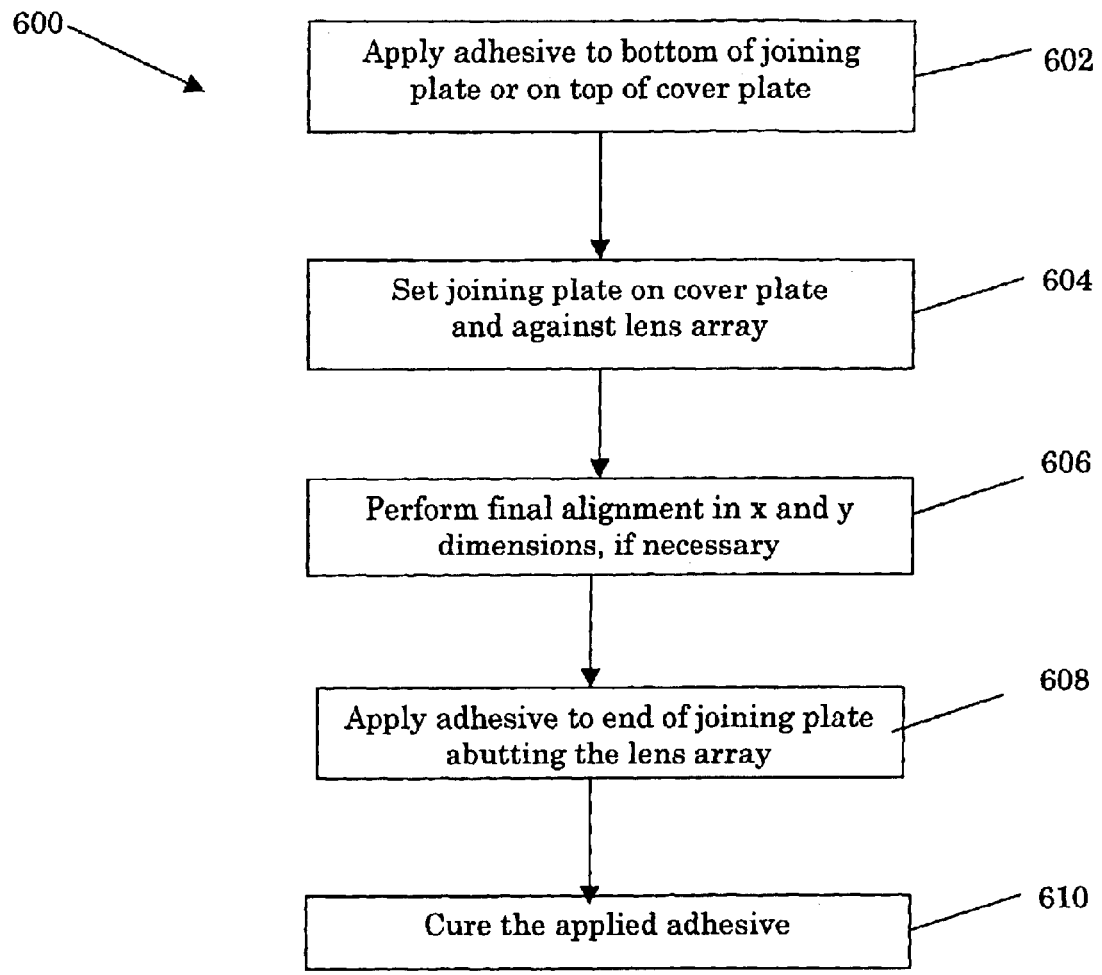
FIG. 6 : Joining the Fiber Array and Lens Array

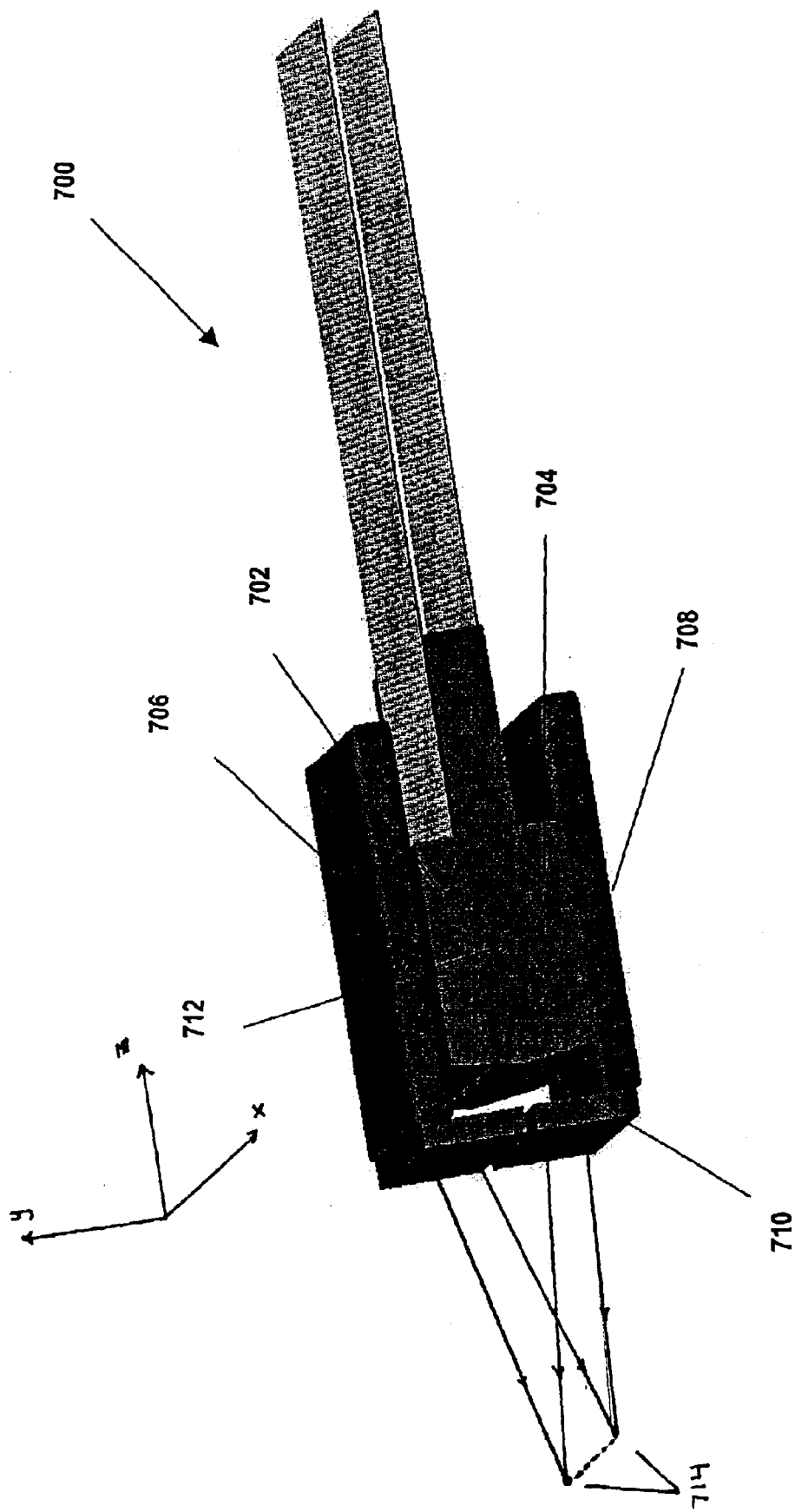
FIG. 7: A Switching Array

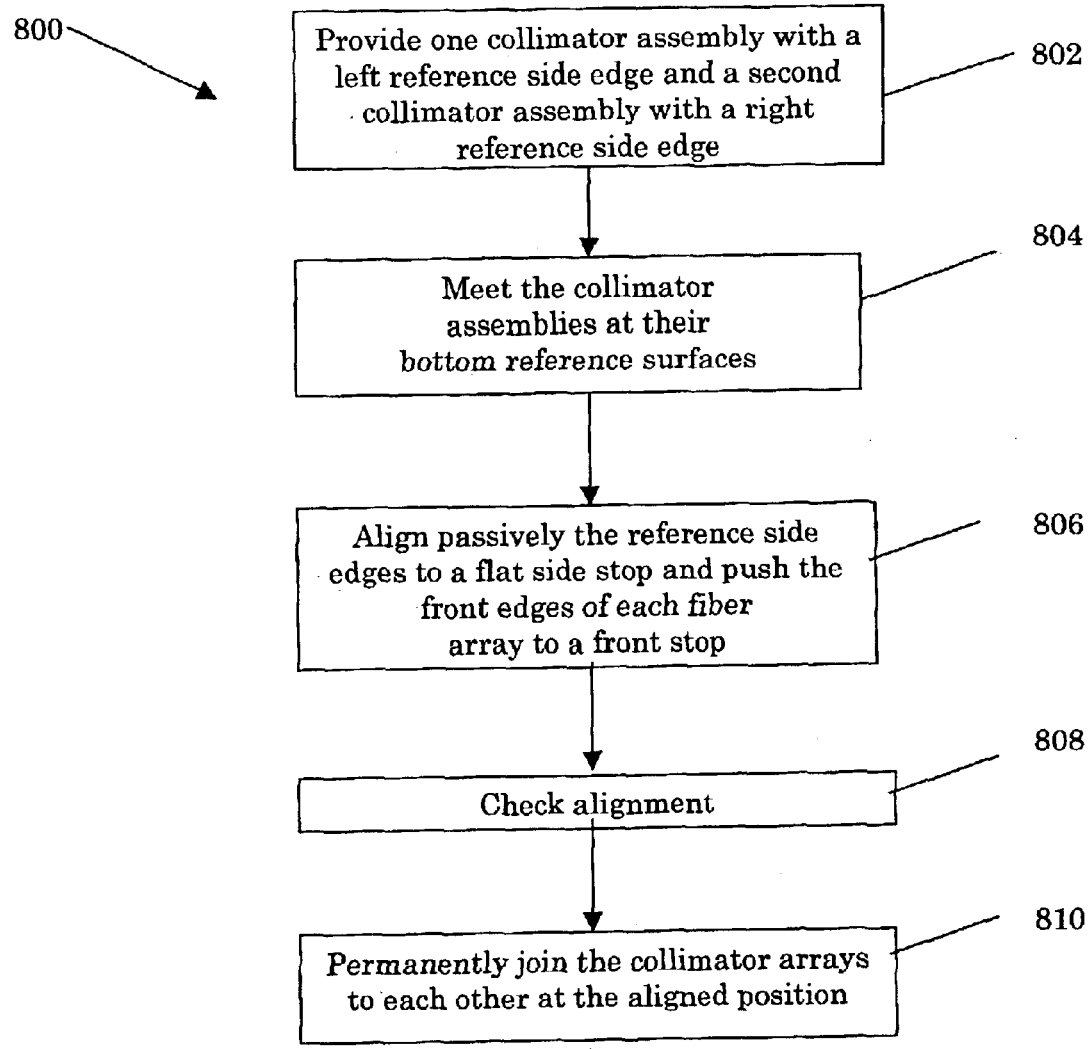
FIG. 8 : Assembling the Switching Array

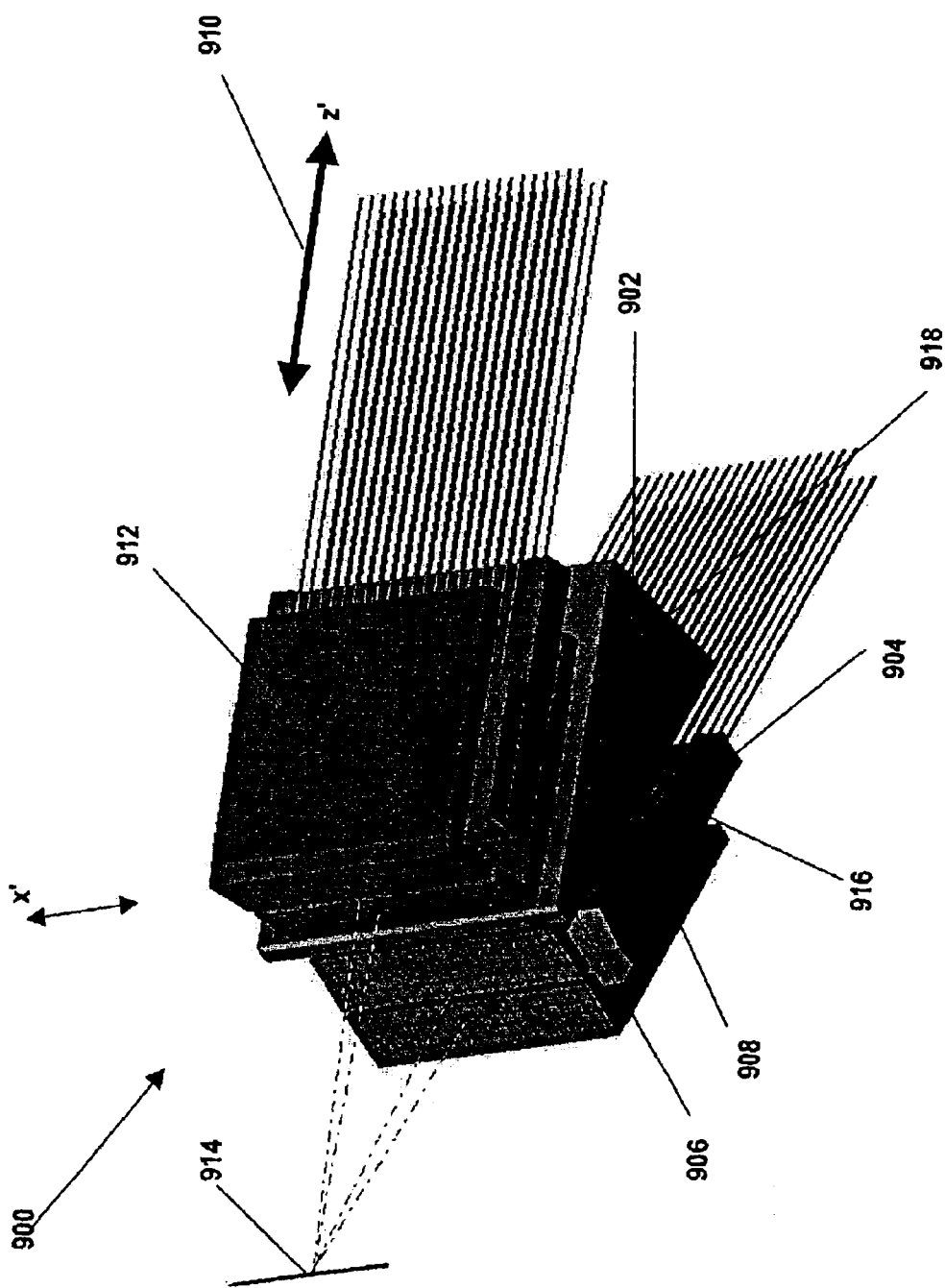
FIG. 9: An Optical Add/Drop Array

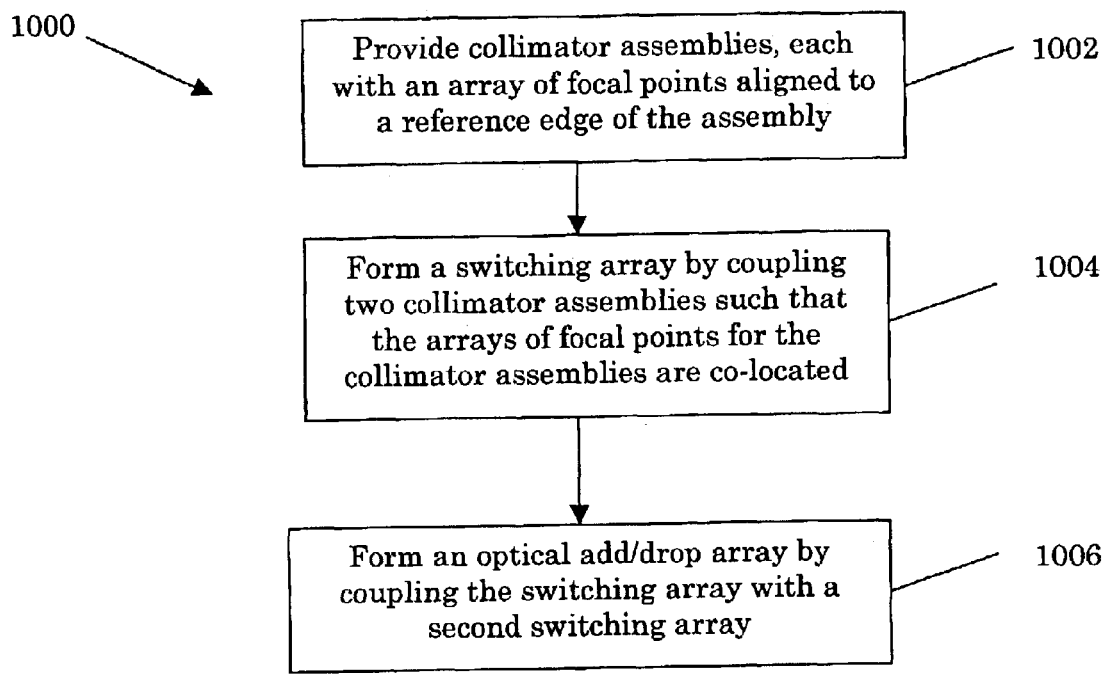
FIG. 10 : Assembling and Optical Add/drop Array

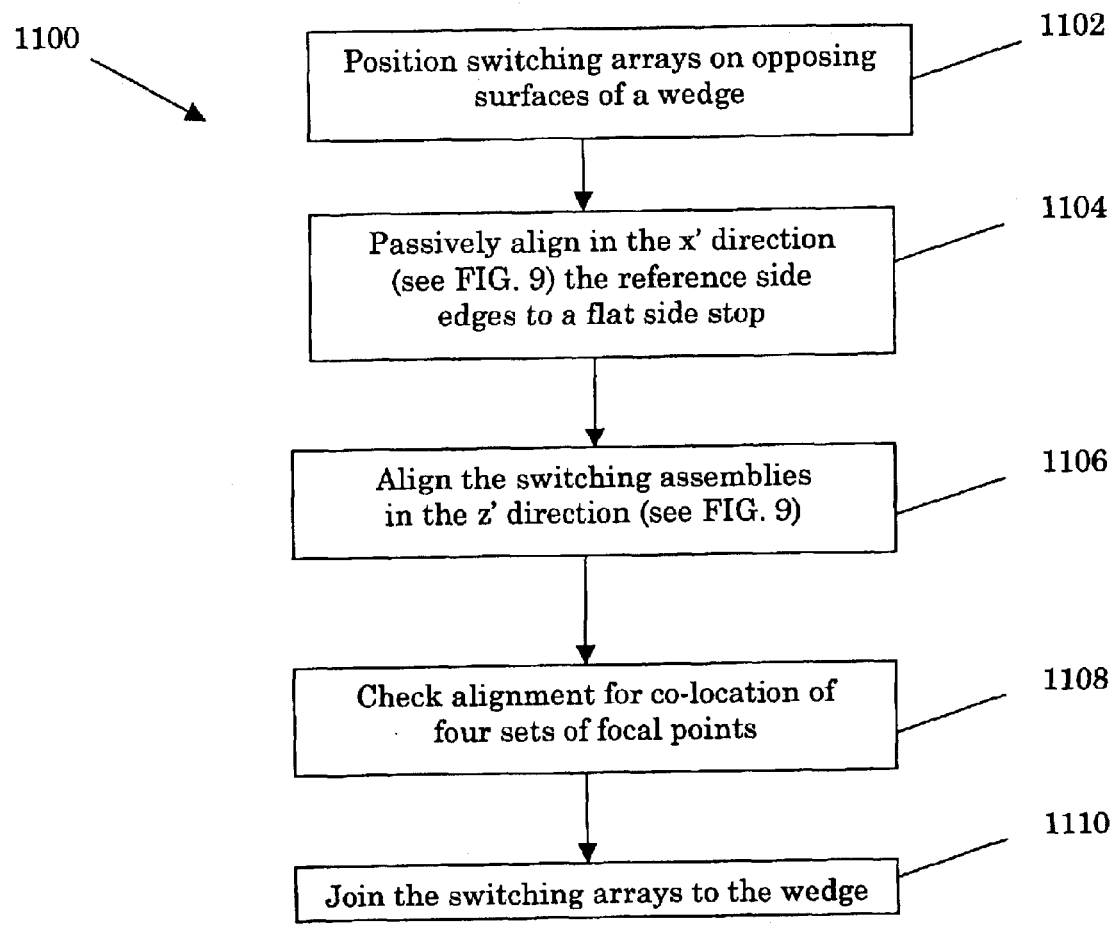
FIG. 11 : Assembling an Optical Add/Drop Array with Two Switching Arrays

MULTIPLE CHANNEL OPTICAL ASSEMBLY AND METHOD OF MANUFACTURE

BACKGROUND OF THE INVENTION

1. Field of the Invention

The present invention relates to optical components and, in particular, to optical components that direct multiple optical channels or perform optical switching from one channel to another, including add and drop functions for optical wavelength channels and to methods for manufacturing such optical components.

2. Description of the Related Art

Optical networks use a variety of optical components, including wavelength channel add/drop modules, optical wavelength multiplexer/demultiplexers, optical attenuators, optical isolators and optical switches. Such components are fundamental to the next generation WDM network. To make the network practical, the necessary optical devices generally must be in the form of arrays of optical elements that physically include multiple communication channels. Functional examples of such components are provided in our co-pending applications entitled "Reconfigurable Optical Add/Drop Module," filed on May 18, 2001, having Ser. No. 09/861,117 and "Switch and Variable Optical Attenuator for Single Or Arrayed Optical Channels," filed on Jul. 16, 2001, and having Ser. No. 09/907,496, both of which are hereby incorporated by reference as though fully set forth herein.

Present implementations of these components remain bulky and expensive and have low levels of integration, despite the continued efforts of optical component designers to improve the quality and cost-effectiveness of these optical components. The unavailability of reliable and cost-effective components has retarded the implementation of optical networks and has limited optical networks to very high traffic systems.

Currently, one area of focus for the development of commercially practical components is optical interconnect technology, and in particular, free-space optical interconnection, where signals travel through space to communicably connect optical elements with each other. Free-space based optical devices advantageously minimize the use of optically undesirable materials, such as epoxy adhesives, which when present in a light path can cause distortions that reduce component reliability and useful life. Free-space based fiber optic collimators, which are fundamental components for free-space optical interconnection, advantageously operate with a large separation distance, in comparison with the optical wavelength, between communicating collimators and with relatively low signal attenuation or loss. Such collimator arrays include an array of optical fibers that communicate through space with an array of light collimating lenses. Because of the inherent low-loss advantages of these collimator arrays, substantial resources are being applied to make them cost effective to mass-produce and package in optical devices.

Nevertheless, cost-effective and reliable free-space based collimator arrays and the optical devices that could employ them remain unavailable. The steps of performing optical alignment and attachment at each stage of device assembly continue to be difficult and labor-intensive. Misalignment loss in the space between the optical fiber array and collimating lens array due to scattering, divergence and other distortions of light continues to be problematic. Shrinkage and expansion of the adhesives that are used to join the fiber array with the lens array due to adhesive curing, temperature, aging, or other effects are also major issues because of their short and long-term effects on optical alignment. A related issue is the effect of uneven distributions of adhesive that can stress optical elements and reduce overall reliability. When balanced against the manufacturing priorities of yield and manufacturing cost per unit, these issues become even more difficult to overcome.

A need exists, therefore, for optical devices, such as collimator arrays and switching arrays, including optical add-drop switch arrays and variable optical attenuator (VOA) arrays, that can be easily and cost-effectively manufactured for optical communication applications.

SUMMARY OF THE INVENTION

The present invention provides, in one aspect, arrayed optical devices and methods for their manufacture and packaging.

In one aspect, the present invention provides a method of manufacturing a collimator array including providing an array of lenses and a fiber array comprising regularly-spaced optical fibers such that an output axis of each optical fiber has a predetermined spatial position and orientation with respect to a reference edge of the fiber array. The fiber array is aligned with the array of lenses at an alignment position such that collimated light from each lens has a predetermined position and direction with respect to the reference edge, where the array of lenses is separated from the fiber array by a gap. The fiber array is coupled to the lens array at the alignment position.

In a second separate aspect, the present invention provides a method of assembling an optical switching array. The method preferably includes the steps of providing a first collimator array having a right reference edge with respect to its array of collimated output, and a second collimator array having a left reference edge, where each collimator array includes a fiber array and a lens array. The collimator arrays are aligned and then coupled to each other at an alignment position.

Another distinct aspect of the present invention provides a method of manufacturing a low loss optical fiber collimator array. A lens array is provided and mounted between the fiber array and a mirror so that a position of the lens array can be adjusted in a plurality of dimensions, the mirror having a first position with respect to the lens array. A baseline alignment position is identified for the lens array using retroreflection from the mirror at the first position. The mirror is moved to a second position spaced farther from the lens array and a second baseline alignment position is identified for the lens array using retroreflection from the mirror at the second position. The fiber array is aligned with the array of lenses beginning from the second baseline alignment position such that collimated light from each lens has a predetermined position and direction with respect to the reference edge, the lens array being separated from the fiber array by a gap. The fiber array is rigidly fixed with respect to the lens array after alignment.

In a fourth separate aspect, the present invention provides a method of manufacturing optical array switching devices. In the case of an optical add/drop array switch, the method includes providing at least four collimator arrays, where each collimator array includes a set of beam waists with a predetermined position with respect to a reference edge of the collimator array. The method couples at an aligned position two of the collimator arrays into a first switching array having a switching array reference edge. The two remaining collimator arrays are similarly coupled into a second switching array. The first switching array is coupled with a second switching array via an alignment guide, such as a wedge, such that the four sets of beam waists for the collimator arrays are substantially co-located.

In a specific example for the fourth aspect implemented to provide a 1×2 or 2×1 array switch, the three sets of beam waists for the collimator arrays preferably are similarly co-located. In another specific example for the fourth aspect, implementing the case of an array VOA switch, the two sets of beam waists for the input and output collimator arrays are co-located, with or without an extra wedge alignment guide to couple the pair of collimators.

Further embodiments as well as modifications, variations and enhancements of the invention are also described herein.

BRIEF DESCRIPTION OF THE DRAWINGS

Aspects and advantages of the present invention are described below with reference to the drawings, which form a part of this disclosure.

FIG. 1A is a conceptual representation of a collimator array with a free-space optical interconnection.

FIG. 1B is a flow diagram depicting a preferred method for assembling a collimator array with a free-space optical interconnection such as is functionally represented in FIG. 1A.

FIG. 2 is a perspective view of one embodiment of a fiber array such as may be provided in the assembling method of FIG. 1B.

FIG. 3 is a flow diagram illustrating a basic method of providing a fiber array, which is represented as a single step in the assembling method of FIG. 1B.

FIG. 4A is a flow diagram illustrating an example of a method of aligning a lens array with a fiber array, which is represented as a single step in the assembling method of FIG. 1B.

FIG. 4B illustratively depicts conceptual representations of a fiber array, a lens array and a mirror array in their relative mounted positions in an alignment method such as the method set forth in FIG. 4A.

FIG. 5A depicts an exploded view of a preferred embodiment of components of a collimator array before assembly of the components.

FIG. 5B is a perspective view of one embodiment of a collimator array such as may be assembled according to the method of FIG. 1B.

FIG. 6 is a flow diagram illustrating an example of a method of joining a lens array with a fiber array, represented, as a single step in the assembling method of FIG. 1B.

FIG. 7 is a perspective view of one embodiment of a switching array.

FIG. 8 is a flow diagram depicting a preferred method for assembling a switching array, such as the switching array depicted in FIG. 7.

FIG. 9 is a perspective view of one preferred embodiment of an optical add/drop array.

FIG. 10 is a flow diagram depicting a preferred method for assembling an optical add/drop array, such as the optical add/drop array depicted in FIG. 9.

FIG. 11 is a flow diagram illustrating an example of a method of forming an optical add/drop array, generally represented as a single step in the assembling method of FIG. 10.

DETAILED DESCRIPTION OF THE PREFERRED EMBODIMENTS

A fiber optical collimator is an optical device that converts the highly divergent output beam of an optical fiber into a wider beam of very low divergent or convergent angles, usually employing some lensing method. Fiber optical collimators are usually used to couple light from one fiber (in a transmitting fiber collimator) to another fiber (in a receiving fiber collimator, usually of identical construction) over a relatively long working distance. One desirable quality of fiber collimator light coupling is low loss, which is attained by matching the optical beam mode of the transmitting collimator to that of the receiving collimator at the mid-point of the working distance. With identical or similar transmitting and receiving collimators, this mode matching is equivalent to locating the necked-down point (beam waist) of the collimated beam at the mid-point of the working distance. Such alignment of each collimator could be done by placing a mirror at the half working distance point, retro-reflecting the light back and adjusting the lens to fiber gap until the backward coupled light is maximized.

Given a fiber and collimating lens of a certain focal length, there is a maximum collimator working distance that will allow nearly 100% coupling. For a working distance greater than this maximum value, mode matching between the transmitting and receiving collimators is not possible and coupling is less than 100%. In general, for a fixed collimator working distance (equivalent to twice the fiber to mirror distance) less than the maximum value, there are two positions of the lens that will locate the collimated beam waist at the mirror and maximize the retro-coupling to nearly 100%.

The first position, with the lens closer to the fiber, has the advantage that the beam spot on the lens is smaller so that the clear aperture of the lens, over which any lens aberration has to be minimized for low loss, is smaller. The second position, with the lens farther away from the fiber, has the advantage that the beam waist at the mirror is smaller. Hence the clear aperture of any switching mirror can be smaller. A smaller beam waist also means that collimator coupling is more tolerant to any directional error of the beam axis. In the context of an array collimator with closely spaced fiber channels, a small clear aperture requirement for either the lens array or the mirror array is desirable. In general, either the first or second position can provide optimal low loss coupling. For a working distance greater than the maximum value, an adjustment of the lens to fiber gap distance will produce only a single instead of two retro-coupling peak positions. However, under this configuration, the collimator is very sensitive to any lateral position error of the lens, so that it could be utilized to adjust the x and y transverse positions together with the pitch and yaw of the lens array to maximize the retro-coupling across the full array of channels.

FIG. 1A is a conceptual illustration of one preferred embodiment of a collimator array 122. The collimator array 122 includes a fiber array 110 separated from a lens array 112 by a spatial gap 114. The gap may contain air, a vacuum, or contain another gas, preferably a substantially transparent gas for the light used in the fibers. In FIG. 1A, the fiber array 110 includes eight optical fibers 124 corresponding to eight independently switchable communication channels configured as an 8×1 array, although any convenient number of fibers (or channels) configured as a one or potentially two-dimensional array may be provided. Similarly, the collimator array 122 includes a lens array 112 having eight corresponding lenses for collimating light that emerges from an optical fiber 124 of the fiber array 110, travels through the spatial gap 114 and enters a lens. A rigid coupling device 116 preferably joins the fiber array 110 with the lens array 112. The coupling device 116 fixes the relative positions of the fiber array 110 and the lens array 112 once the output of each fiber is sufficiently aligned with its corresponding light-collimating lens.

The collimating array 122 exhibits a design feature that a side edge, such as side edge 118, is a reference edge with respect to collimated beams 120 of light that emerge from each lens. That is, the emerging point and direction of each beam 120 is precisely determined (e.g., to preferably within about a few micrometers (um) in the x, y and z dimensions and preferably within about 0.5 milliradians (mrad) in the θx, θy and θz orientations) with respect to the reference edge 118. Preferably, each beam 120 is parallel to the reference edge 118 in two dimensions (i.e., in the x and z dimensions in FIG. 1A) and has the same specific downward angle (e.g., 2.4°) relative to the reference edge 118 in a third dimension (y dimension in FIG. 1A). Furthermore, each beam 120 is preferably separated from its nearest neighboring beam 120 by the same predetermined distance.

In a preferred embodiment, any optical devices that combine multiple collimating arrays having the above-described design feature may be assembled without having to repeat any significant active alignment procedure. As an elemental component of other optical devices such as switching arrays, optical add/drop arrays and variable optical attenuators for arrayed optical channels, use of such a collimating array 122 facilitates the manufacturing processes for these devices.

FIG. 1B depicts a preferred method 100 of assembling a collimator array, such as the collimator array 122 functionally represented in FIG. 1A. The method 100 preferably includes two initial steps 102, 104 of providing a fiber array and a lens array such as the arrays 110, 112 conceptually illustrated in FIG. 1A.

FIG. 2 illustrates an example of one preferred embodiment of a fiber array 200 that may be manufactured and provided in step 102 for assembling a collimating array. The fiber array 200 includes a set of preferably equal length optical fibers 202, a substrate 204 and a cover plate 206. The substrate 204 illustratively includes a front end 208, a top side 209, a bottom side 211 and a reference edge 212. The optical fiber 202 preferably is typical telecommunications grade optical fiber that has been stripped of the conventionally applied plastic outer coating. Each optical fiber strand 202 illustratively includes an input end 214 and an output end 216.

FIG. 3 illustrates preferred basic steps in a method 300 of providing a fiber array 200 such as that depicted in FIG. 2. A first step 302 in the method 300 is to provide the substrate 204, where the substrate 204 preferably is a wafer of silicon, ceramic, glass or other convenient material with a similar thermal expansion coefficient and rigidity and includes a set of parallel grooves 210, preferably V-shaped, which run the length of the substrate 204. Each of the V-grooves 210 in the substrate 204 is preferably sufficiently deep and wide to permit a portion of a length of optical fiber 202 to be fully inset within the groove 210.

In a second step 304, an end of a strand of optical fiber 202 is set within each V-groove 210 of the substrate 204. Preferably, each strand of optical fiber 202 rests firmly below the top and throughout the length of each V-groove 220, with the output end 216 of each fiber 202 being flush with the front side 208 of the substrate 204. The remaining length of each strand of fiber 202 preferably extends from the back side of the substrate 204.

In a third step 306, the cover plate 206 is set on the top side 209 of the substrate 206. The cover plate 206 is preferably made of Pyrex or other similar material and covers all of the V-grooves 209 to hold each strand of optical fiber 202 in place. Although the cover plate 206 may cover all or substantially all of the top side 209 of the substrate 204, the cover plate 206 may cover the top side 209 of the substrate 204 at and/or near its front end 208 as shown in FIG. 2, where the output ends 216 of the optical fiber 202 are positioned. By so placing the cover plate 206, the output ends 216 of the optical fiber 202 are fixed in position, with the output ends 216 of the optical fiber 202 fixed substantially parallel to each other.

The fiber array 200 is preferably specified and assembled with a threshold level of machined precision. For example, in one preferred embodiment, the grooves 210 in the substrate 204 are preferably manufactured to be equally spaced apart with a tolerance of ±0.5 micrometers (um). Furthermore, the front end 208 of the substrate 204 is preferably also machined such that along the front end 208 of the substrate 204 a predetermined distance is provided between each groove 210 (and thereby each optical fiber's core) and the reference edge 212 to a tolerance of ±5 um. The reference edge 212 is preferably also substantially parallel to the direction of the V-grooves 210, and optionally, only substantially parallel near the front end 208 of the substrate 204, to within at most about 0.25°. Furthermore, the substrate 204 is preferably machined such that its bottom surface 211 is parallel to within 0.5 milliradians (mrad) of an imaginary plane defined by the optical fibers 202 once they are fixed in position at the front end 208 of the substrate 204. The cover plate 206 is also preferably precisely machined so that its top surface is parallel to the bottom surface 211 of the substrate 204.

The surface of each optical fiber 202 at its output end 216 is preferably angled upward with respect to the fiber plane (e.g., 8 degrees from normal) to avoid retro-reflection of light back through the fiber 202. The front sides 208, 216 of the substrate 204 and the cover plate 206 are similarly angled so that the front face of the fiber array 200 preferably is a uniformly angled surface. The output ends 216 of the fiber 202 are preferably polished and coated with an anti-reflecting material, such as silicon nitride ($Si_3N_4$), silica ($SiO_2$) or amorphous silicon. Once assembled, the fiber array 200 includes a set of fibers, where each fiber 202, including each fiber's output axis 216, most preferably is held in position relative to, regularly spaced from, and parallel to the reference edge 212 of the substrate 204.

Returning to FIG. 1B, once the fiber array 110, 200 and the lens array 112 are provided, the fiber array 110, 200 is optically aligned with the lens array 112 in a step 106. FIG. 4A depicts a preferred embodiment of a method 400 for performing the step 106 of aligning the lens array 112 with the fiber array 110, 200. In a first step 402 in the aligning method 400, the fiber array 110, 200, the lens array 112 and preferably an array of mirrors are mounted such that light exiting an optical fiber 124, 202 of the fiber array 110, 200 is directed towards a corresponding lens of the lens array 112, and travels through the lens to a corresponding mirror of the mirror array. Any convenient mirror array may be used to assist in the alignment process 400, although a microelectro-mechanical (MEM) mirror array is preferably used. Such mirrors are known in the art and can be made to precise tolerances.

FIG. 4B provides conceptual illustrations of a fiber array 420, a lens array 422 and a mirror array 424 in their relative positions so as to align a fiber array 420 with a lens array 422. FIG. 4B provides further explanation of the alignment method 400. While FIG. 4B depicts an eight independent switch configuration, the same alignment process 400 may be performed for any two or more independent channels. As shown in FIG. 4B, the lens array 422 is preferably mounted to allow adjustment with respect to at least five degrees of freedom, represented in Cartesian coordinates as x, y, z, θy (yaw) and θz (roll). Freedom with respect to θx (pitch) may be restricted such that the lens array 422 is set to about a 90°-pitch with respect to an incident beam originating from the output side of an optical fiber. Mounting devices for mounting and adjusting the components, including actuators and drive electronics that provide precise adjustment of components in five or six degrees of freedom, are readily available and known in the art.

In a second step 404 of the alignment method 400, one lens, preferably at one end of the lens array, is selected for alignment adjustment. Such a selected lens may be, for example, lens 426 depicted in FIG. 4B. Any convenient alignment methodology may be used including maximizing the signal that retro-reflects back into the optical fiber from the mirror and detecting that signal, using, for example, a splitter at the optical fiber's input side. In a next step 406, the selected end lens 426 is adjusted in the x, y and z dimensions. The position sought for the lens 426 relative to the corresponding fiber in the z dimension is approximately at the focal length for the lens 426 such that, with the mirror positioned at half the working distance of the collimator, the collimated beam waist is at the mirror.

In a next step 408, the lens array 422 is then preferably adjusted to optimize the signal for a channel at the other end of the lens array 422. In this step 408, the lens array 422 is adjusted in orientation, preferably only in roll and yaw as those orientations are represented in FIG. 4B. This adjustment of the lens array 422, first in position and then in orientation, preferably establishes a baseline alignment position. Optionally, the order in which the alignment steps are performed may be reversed.

In the next step 410, the mirror for each channel is adjusted in yaw and pitch (and optionally roll) to identify the maximum signal for each channel within ±0.5 mrad of the baseline alignment pitch and yaw. The next step 412 identifies the channel with the median pitch angle adjustment so as to obtain a signal maximum and identifies the channel with the median yaw adjustment to obtain the signal maximum. These adjustment values represent a center of gravity of the error in the positioning and machining of each lens as well as other factors.

Then, in a step 414, the lens array 422 is adjusted according to the determined median yaw and pitch positions. In this step 414, the lens array 422 is adjusted to optimize the yaw of the collimated output beam from the channel with the median yaw adjustment. This adjustment of the lens array 422 is performed by adjusting the lens array 422 in the x dimension, as represented in FIG. 4B. Similarly, the lens array 422 is adjusted to optimize the pitch of the collimated output beam based on the channel with the median pitch angle adjustment. This adjustment of the lens array 422 is performed by translating the lens array 422 in the y dimension. Once this final adjustment is made, the lens array 422 is in its final alignment position with respect to the reference edge of the fiber array 420.

Referring again to FIGS. 1A & B, once the fiber array 110, 200 and the lens 112 array are in their optimally aligned positions and orientations, another step 108 is performed to permanently join the fiber array 110, 200 and the lens array 112. This completes assembly and fixing of a collimator subassembly according to a first alignment procedure. A second, presently preferred, alignment process is now discussed. This alignment process differs somewhat from the process illustrated in FIG. 4A.

As in the alignment process discussed above, the fiber array 420 is held on a base fixed to a work bench with no degrees of freedom. The lens array 422 preferably is mounted in a holder connected to computer-controlled actuators that provide five degrees of freedom for positioning. These degrees of freedom are along three orthogonal translational directions (x is side-to-side along the lens array direction, y is up and down, z is along the optical axis of the fiber) and about two rotational axes (one about the optical z axis and one about the up and down y axis). The missing rotational axis (about the side-to-side x axis) would pitch the lens array back and forth and is of little consequence for the optical alignment. The lens array 422 preferably is fixed by the tooling in a plane normal to the optical z axis of the fiber. For alignment ease, the tooling is designed so that the two adjustable rotational axes (θy and θz) intersect precisely at the center of the primary alignment lens 426 at one end of the lens array, although other lenses of the array could be used in the alignment process.

Beam positioning and coupling efficiency for this alignment process are monitored by retro-reflecting the light exiting the lens array 422 back into itself and back along the input fiber. This is the same technique discussed above. A monitoring signal is derived from a backward facing fiber splitter in the fiber input line. The retro-reflecting mirror 424 is nominally placed at a distance from the lens array 422 equal to half the desired working distance for the collimator.

This alignment process first uses the three translational degrees of freedom to optimize back coupling for the primary alignment lens 422 in the array. At this stage, translation of the z position of the lens along the optical axis will produce two maxima in the coupling efficiency; at this stage in alignment the exact position of the lens along the z dimension is not critical but is preferably somewhere between z positions corresponding to these maxima in coupling efficiency.

The alignment process next preferably rotates the lens array 422 about the optical z axis extending through the center of the primary alignment lens 426 so that the position of the lens at the other end of the array from the primary alignment lens 426 is optimized. Note that this action will not affect the position of the primary lens because the axis of rotation most preferably passes through the center of this lens.

The alignment process continues by rotating the lens array 422 about the up and down axis y so that the position of the lens at the other end of the array from the primary alignment lens 422 is optimized. Again, this will not change the position of the primary lens because the axis of rotation also was built to pass through the center of this lens. These initial rotations can be done in reverse order.

In a particularly preferred further process in aligning the collimator for low loss, this alignment process positions the lens array 422 on the optical z axis close enough to its final position so that final optimization of all the degrees of freedom can be made individually and independently. In other words, the lens array 422 can be guided into its overall optimum position and not a local minimum within a five-parameter space. First the retro-reflecting mirror 424 is moved several centimeters back from its nominal position at half the desired working distance for the collimator. The lens array 422 z position along the optical axis is then scanned so that the back-coupled signal can be seen passing through a maximum. If a double peak is seen in the coupling efficiency, then the retro-reflecting mirror 424 should be moved further back and the scanning repeated. The lens array 422 is most preferably positioned at the z position corresponding to this maximum and the retro-reflecting mirror is returned to its nominal position at half the desired working distance for the collimator. When the lens array 422 is now scanned in z position about this new placement, a double peaked curve in the coupling efficiency should be observed with a shallow saddle. The new placement of the lens array 422 should appear close to the one of the peaks that is closer to the fiber array 420. It is from this position that the other four degrees of freedom can be independently optimized for example, the in the manner discussed above with respect to the first alignment process to give the final position for the lens array.

The lens array 422 is now preferably attached to the fiber array by means of a rectangular joining plate. Because the sixth degree of freedom (rotation about the side-to-side x axis) was fixed in a plane normal to the fiber axis, the surfaces of the joining plate butt up against the top cover plate on the fiber array and the back surface of the lens array without any wedged glue joints.

FIG. 5A depicts an exploded view of a preferred embodiment of components of a collimator array 500, including a fiber array 520, a lens array 506 and a joining plate 504 for coupling the arrays 520, 506. FIG. 5B depicts a preferred embodiment of the collimator array 500 once the components are assembled in an aligned configuration according to either of the preceding first or second alignment processes. FIG. 6 is a flow diagram illustrating a preferred method 600 of performing the step 108 of joining the lens array 506 with the fiber array 520 to obtain the form depicted in FIG. 5B.

In a first step 602, a coupling material, such as wax, glue, epoxy (preferably curable by ultraviolet (UV) light or heat) or another adhesive as is widely available and known in the art is applied to the bottom side 512 of the joining plate 504 or on the top side 516 of the cover plate 518 for the fiber array 512. While the fiber array 512 and the lens array 506 are mounted in the aligned position, the joining plate 504, in a next step 604, is placed on the cover plate 518 and in a position such that the front side 522 of the joining plate 504 is pushed against the back side 508 of the rigidly mounted lens array 506. After completing this step 604, the joining plate 504 and the fiber array 520 are preferably rigidly coupled. However, the joining plate 504 and the lens array 506, while in contact, preferably remain movable with respect to each other because no adhesive has yet been applied between them.

In a next step 606, a check of the positional alignment of the lens array 506 is performed in two dimensions (i.e., the x and y dimensions in FIGS. 5A & B). Because the front side 522 of the joining plate 504 meets the back side 508 of the lens array 506, such an alignment is readily performed while maintaining the potential for thin and uniform adhesive lines 502 (see FIG. 5B) once the joining plate 504 and the lens array 506 are rigidly joined.

If, for example, the bonding is provided between the bottom side 512 of the joining plate 504 and the top side 514 of the lens array 506, such a positional adjustment either could not be performed or would risk requiring a substantial additional amount of adhesive to provide the rigid bonding. Such a bonding configuration is disclosed in H. Zhou, et al., "Packaging of Fiber Collimators," *Advanced Packaging*, January 2002. A minimum amount and use of adhesive is, for most optical devices, preferred so as to avoid exacerbating negative optical performance effects caused by thermal expansion, aging, creep or bubbling in the adhesive.

Whether or not a final dimensional alignment of the lens array with the fiber array has been required, a next step 608 is preferably the application of the adhesive between the joining plate 504 and the lens array 506. Preferably, a minimal amount of adhesive is uniformly applied and provides a rigid bond between the joining plate 504 and the lens array 506. Preferably, the adhesive has a useful lifetime that exceeds that of the device into which the collimator array 500 is incorporated.

If the adhesives used in the preceding steps 602, 608 are curable, such as a UV-curable epoxy, then the applied adhesives are cured in the next step 610. This step 610 preferably hardens the temporarily established bonds between the components 504, 506, 518 without disturbing the components from their aligned relative positions.

When in use, the properly constructed collimator array 500 emits an array of parallel and regularly-spaced collimated beams 524 that are also parallel to a reference edge 510 of the collimator array 500 in two dimensions (i.e., y and z dimensions in FIGS. 5A & B) and have the same downward angle (e.g., 2.4°) with respect to the reference edge 510 in the third dimension (i.e., x dimension in FIGS. 5A & B). Furthermore, the collimated beams 524 originate from regularly spaced predetermined points in space with respect to the reference edge.

With a collimator 500 having the alignment features discussed herein, many arrayed optical devices that include such a collimator array 500 may be easily manufactured. FIG. 7, for example, depicts a switching array 700 that employs two such collimating arrays 702, 704. To perform as a signal switching device, the switching array 700 preferably includes an array of mirrors positioned about one to two cm from the collimating arrays (i.e, at the line of beam waists 714 of the collimating arrays 702, 704) to direct signals from a channel of one collimating array 702 into or away from a corresponding channel of the other collimating array 704.

FIG. 8 illustrates a preferred method 800 for assembling a switching array such as the switching array 700 depicted in FIG. 7. In a first step 802, the two collimator arrays 702, 704 are provided, where one collimator array 704 includes a reference edge on one side (e.g., left side) of the array 704 and the other collimating array 702 includes a reference edge on the opposite side (e.g., right side) of the array 702. The collimating arrays 702, 704 may be identical if they are manufactured with both left side and right side reference edges. In FIG. 5B, for example, the reference edge 510 for the collimator array 500 is on the viewable left side.

Returning to FIGS. 7 and 8, in the next step 804, the collimator arrays 702, 704 with opposing reference surfaces are mated so that their reference surfaces line up. That is, preferably the bottom surface of one collimator array 702 is mated with the bottom surface of the other collimator array 704. In FIG. 7, numeral 710 identifies the location where the bottom surfaces of the collimator arrays 702, 704 meet. Optionally, the top surfaces 706, 708 of the collimator arrays 702, 704 are mated. In a top-surface mating configuration, the collimating beams of each collimator array rather than having a downward angle relative to the reference edge as discussed above in connection with FIGS. 6 and 7, have an upward angle with respect to the reference edge. The objective of either form of switching array is that the arrays of beam waists 714 for the pair of collimator arrays will be easily co-located once the collimator arrays 702, 704 are fixed in position relative to each other. The mating of top or bottom surfaces fixes the relative positions of the collimator arrays 702, 704 in one dimension (i.e., the y dimension as represented in FIG. 7).

Because the collimator arrays 702, 704 are manufactured to have their beams aligned to a reference surface, no active alignment procedure is required as a step in the manufacture of the switching array 700. Thus, in a next step 806, the collimator arrays 702, 704 may be passively aligned in a second dimension (i.e., the x dimension as represented in FIG. 7) by, for example, passively aligning each collimator array's reference side edge against a flat stop. Furthermore, the alignment in the third dimension may be obtained by, for example, pushing the front side of the fiber array portion of the collimator arrays 702, 704 against a flat stop. The relatively straightforward assembling steps of pushing the collimator arrays 702, 704 against stops and against each other perform the alignment between them 702, 704 such that the collimator arrays' sets of beam waists 714 are co-located.

Nevertheless, in a manufacturing context, a quality control step 808 of checking the alignment of the switching array is preferably performed. If for any reason the switching array is not aligned, the components are preferably discarded or remachined. The collimator arrays, however, are preferably manufactured with precision sufficient to maintain a high yield. In a mass production context, a cost analysis is performed to optimize cost of level of precision per unit against yield.

Assuming the check of alignment meets specifications, a next step 810 is performed of permanently joining the collimator arrays to each other at the aligned position. This step 810 may be performed, as in previous steps, using a minimal amount of a convenient adhesive, such as UV-curable epoxy.

In an alternative embodiment, rather than coupling two collimator arrays together for the switching array, the switching array is formed from a single substrate, preferably having approximately double the normal width and having grooves on opposing sides to hold the optical fiber for two sets of channels. Although formed from a single substrate, a fiber array pair is provided that appears similar to the bottom surface-to-bottom surface array configuration depicted in FIG. 7. The fiber array pair preferably includes a single reference edge on one side (i.e., left or right side). The alignment procedure in this embodiment comprises aligning the fiber array pair with two lens arrays such that the sets of beam waists for the collimating arrays that are formed when the alignment is completed are co-located.

FIG. 9 depicts a preferred embodiment of an optical add/drop array 900 which may be manufactured using a pair of switching arrays 904, 912 such as the switching array 700 illustrated in FIG. 7. To perform as an optical add/drop device, the optical add/drop array 900 preferably includes an array of mirrors positioned at a line of beam waists (indicated by line 914 in FIG. 9) of the collimating arrays to direct signals according mirror position. Preferably, each mirror includes three-reflection positions corresponding to two alternative in/out positions and an add/drop position as is commonly provided in an add/drop module.

FIG. 10 is a flow diagram illustrating three basic steps in assembling such an add/drop array 900 from a set of four collimator assemblies having the alignment characteristics discussed herein. In the first step 1002, a set of four collimator assemblies are provided, two with reference edges on their left side and two with reference edges on their right side. In the second step 1004, a pair of switching arrays 902, 904 is assembled, each requiring a collimator with one left reference edge and one collimator with a right reference edge, preferably using the method 800 discussed in connection with FIG. 8. Then, in a third step 1006, the switching arrays 902, 904 are used to form the optical add/drop array 900.

FIG. 11 details a method 1100 for assembling the optical add/drop array 900 from the pair of switching arrays 904, 912. In a first step 1102, the two switching arrays 904, 912 are positioned on opposing surfaces of a wedge 902 such as is depicted in FIG. 9. The wedge 902 may be of any convenient rigid material, and in one preferred embodiment is a Pyrex prism. As shown in FIG. 9, the wedge 902 has an angle of about 25°, although the wedge 902 may have any convenient angle, and may even be in the form of a block having a corresponding angle of greater than 90°. Alternatively, instead of a wedge, another guide for aligning the switching arrays is used, such as wedge-shaped rails on which the switching arrays rest. In FIG. 11, the wedge 902 is also specified to have its side (triangular) surfaces be perpendicular to its bottom surface 916 and have its side surface and bottom surface 916 be planar to preferably within about ±5 um.

As with the assembly of a switching array discussed above, an active alignment step is preferably unnecessary to the assembly of the optical add/drop array 900. Thus, in a next step 1104, the reference edges 906, 908 of the switching arrays 912, 904 with the wedge 902 between them 912, 904 may be passively aligned against a flat stop. As represented in FIG. 9, this alignment is performed in the x' direction. The switching arrays 912, 904 include such reference side edges 906, 908 because these edges are provided by the collimator arrays that comprise each switching array 912, 904.

In a next step 1106, as shown in FIG. 9, the switching arrays 912, 904 are preferably aligned with each other in the z' direction 910 by preferably pushing the switching arrays 912, 904 against flat stops. In the embodiment depicted in FIG. 9, alignment in the z' direction 910 may be achieved passively because alignment within about ±50 um in this direction is sufficient and generally readily obtainable without precise instrumentation. Alternatively, however, an active alignment step is performed such as by using MEM mirrors to reflect or retro-reflect light beams into appropriate collimators.

Once the switching arrays are aligned in the z' direction, a next step 1108 is preferably performed of checking the alignment of the switching arrays 912, 904 to verify co-location of the four sets of beam waists. Again, as with the assembly of the switching array, if the check determines that optical add/drop array 900 is not aligned, the components are preferably discarded or remachined. With the switching arrays 912, 904 in a final alignment position, the switching arrays 912, 904 are preferably bonded to the wedge 902 at the aligned position using an adhesive material such as the UV-curable epoxy discussed herein to form the optical add/drop array 900.

While preferred embodiments of the invention have been described herein, many variations are possible that remain within the concept and scope of the invention. Such variations would become clear to one of ordinary skill in the art after inspection of the specification and drawings. The invention therefore is not to be restricted except within the spirit and scope of any appended claims.

What is claimed is:

1. A method of manufacturing an optical device comprising:

providing a fiber array comprising regularly-spaced optical fibers such that an output axis of each optical fiber has a predetermined spatial position and orientation with respect to a reference edge of the fiber array;

providing an array of lenses and a mirror array, the mirror array positioned at a beam waist line for the array of lenses, the array of lenses mounted between the fiber array and the mirror array, such that the array of lenses may be adjusted with at least five degrees of freedom;

identifying a baseline position alignment position for the array of lenses;

aligning the fiber array with the array of lenses at an alignment position such that collimated light from each lens has a predetermined position and direction with respect to the reference edge, the array of lenses being separated from the fiber array by a gap; and coupling the fiber array to the lens array at the alignment position.

2. The method of claim 1, the providing a fiber array comprising:

providing a substrate having a set of regularly-spaced grooves for holding the optical fibers, each groove having an end with a predetermined spatial position with respect to a reference edge of the substrate;

positioning an optical fiber in each groove; and applying a cover plate such that the output axis of each optical fiber has a fixed predetermined position with respect to the edge of the substrate.

3. The method of claim 2, the coupling the fiber array comprising:

applying epoxy between a top side of the cover plate and a bottom side of a joining plate and between a back side of the lens array and a front side of the joining plate;

setting the joining plate on the cover plate;

abutting the front side of the joining plate against a back side of the lens array; and curing the epoxy.

4. The method of claim 2, the coupling the fiber array comprising:

applying coupling material between a top side of the cover plate and a bottom side of a joining plate;

setting the joining plate on the cover plate to rigidly couple the cover plate and the joining plate; and aligning the fiber array with the lens array in two available dimensions if the fiber array and the lens array are not so aligned.

5. The method of claim 4, the coupling the fiber array further comprising:

applying additional coupling material between a back side of the lens array and a front side of the joining plate to rigidly couple the lens array and the joining plate; and solidify the coupling material and the additional coupling material.

6. The method of claim 2, the coupling the fiber array comprising:

applying coupling material between a top side of the cover plate and a bottom side of a joining plate; and setting the joining plate on the cover plate to rigidly couple the cover plate and the joining plate.

7. The method of claim 1, further comprising:

identifying an optimal pitch angle adjustment and an optimal yaw adjustment for each mirror of the mirror array with respect to the baseline alignment position to determine an average optimal pitch angle adjustment and an average optimal yaw adjustment; and translating the lens array in one dimension to account for the median optimal yaw position and translating the lens array in a second dimension to account for the median optimal pitch position.

8. The method of claim 1, the identifying a baseline alignment position comprising:

adjusting the position of the lens array such that light emerging from a first fiber of the fiber array retro-reflects into the first fiber; and adjusting the orientation of the lens array such that light emerging from a second fiber of the fiber array retro-reflects into the second fiber.

9. The method of claim 8, wherein the first and second fibers are located at opposite ends of the fiber array.

10. The method of claim 8, further comprising:

identifying an optimal pitch angle adjustment and an optimal yaw adjustment for each mirror of the mirror array with respect to the baseline alignment position to determine a median optimal pitch angle adjustment and a median optimal yaw adjustment; and linearly translating the lens array in one dimension to account for the average optimal yaw position and linearly translating the lens array in a second dimension to account for the average optimal pitch position.

11. The method of claim 1, further comprising polishing the output surface of each optical fiber and coating the output surface of each optical fiber with an anti-reflecting material.

12. A method of manufacturing an optical device comprising:

providing a fiber array comprising regularly-spaced optical fibers such that an output axis of each optical fiber has a predetermined spatial position and orientation with respect to a reference edge of the fiber array;

providing an array of lenses and mounting the array of lenses between the fiber array and a mirror so that a position of the array of lenses can be adjusted in a plurality of dimensions, the mirror having a first position with respect to the array of lenses, the array of lenses being separated from the fiber array by a gap;

identifying a first baseline alignment position for the array of lenses using retroreflection from the mirror at the first position;

moving the mirror to a second position spaced farther from the array of lenses and identifying a second baseline alignment position for the array of lenses using retroreflection from the mirror at the second position; and coupling the fiber array to the lens array at the alignment position.

13. The method of claim 12, wherein the mirror is an array of mirrors corresponding to the lens array.

14. The method of claim 12, further comprising:

moving the mirror to a third position closer to the first position than to the second position;

further aligning the lens array with the mirror at the third position.

15. A method of manufacturing an optical device comprising:

providing a fiber array comprising regularly-spaced optical fibers such that an output axis of each optical fiber has a predetermined spatial position and orientation with respect to a reference edge of the fiber array;

providing a lens array and mounting the lens array between the fiber array and a mirror so that a position of the lens array can be adjusted in a plurality of dimensions, the mirror having a first position with respect to the lens array;

identifying a first baseline alignment position for the lens array using retroreflection from the mirror at the first position;

moving the mirror to a second position spaced farther from the lens array and identifying a second baseline alignment position for the lens array using retroreflection from the mirror at the second position;

aligning the fiber array with the array of lenses beginning from the second baseline alignment position such that collimated light from each lens has a predetermined position and direction with respect to the reference edge, the lens array being separated from the fiber array by a gap; and rigidly fixing the fiber array with respect to the lens array after aligning.

16. A method of manufacturing an optical device comprising:

providing a first collimator array and a second collimator array with opposing reference edges, each collimator array comprising a fiber array and a lens array;

coupling a side of the first collimator array to a corresponding side of the second collimator array to fix relative positions of the collimator arrays in one spatial dimension, the side of the first collimator array being substantially parallel to a plane of the fiber array of the first collimator array;

aligning the opposing reference edges to fix relative positions of the collimator arrays in a second spatial dimension;

aligning front edges of the collimator arrays to fix relative positions of the collimator arrays in a third spatial dimension; and coupling the collimator arrays to each other at the alignment position.

17. The method of claim 16, wherein the providing the first collimator array comprises:

providing the fiber array comprising regularly-spaced optical fibers such that an output axis of each optical fiber has a predetermined spatial position and orientation with respect to a reference edge of the fiber array;

providing the lens array and mounting the lens array between the fiber array and a mirror so that a position of the lens array can be adjusted in a plurality of dimensions, the mirror having a first position with respect to the lens array;

identifying a first baseline alignment position for the lens array using retroreflection from the mirror at the first position;

moving the mirror to a second position spaced farther from the lens array and identifying a second baseline alignment position for the lens array using retroreflection from the mirror at the second position;

aligning the fiber array with the array of lenses beginning from the second baseline alignment position such that collimated light from each lens has a predetermined position and direction with respect to the reference edge, the lens array being separated from the fiber array by a gap; and rigidly fixing the fiber array with respect to the lens array after aligning.

* * * * *